United States Patent [19]

Lannuzel

[11] 4,118,641

[45] Oct. 3, 1978

[54] CHOPPER INCLUDING TRANSISTOR SWITCHES

[75] Inventor: Roger Lannuzel, Saint-Denis, France

[73] Assignee: Compagnie Industrielle des Telecommunications S.A., Paris, France

[21] Appl. No.: 775,685

[22] Filed: Mar. 8, 1977

[30] Foreign Application Priority Data

Mar. 11, 1976 [FR] France .................................. 76 06976

[51] Int. Cl.² ............................................. H03K 17/00
[52] U.S. Cl. .................................. 307/240; 307/254; 307/270; 323/75 E; 363/124
[58] Field of Search ...................... 307/240, 270, 254; 363/18, 124, 75; 323/75 E

[56] References Cited

U.S. PATENT DOCUMENTS

| 3,283,238 | 11/1966 | Huge et al. ......................... 323/75 E |
| 3,290,573 | 12/1966 | Kamens ................................ 307/240 |

Primary Examiner—Stanley D. Miller, Jr.
Assistant Examiner—B. P. Davis
Attorney, Agent, or Firm—Sughrue, Rothwell, Mion, Zinn and Macpeak

[57] ABSTRACT

A chopper having four transistor switches and driven by an AC reference signal provides an alternating output signal. During each half period of the reference signal two of the transistor switches are nonconductive, one is conductive and the fourth commutates at a frequency representative of the error between the reference signal amplitude and a predetermined proportion of the output signal amplitude. Conduction losses are minimized.

2 Claims, 7 Drawing Figures

CHOPPER INCLUDING TRANSISTOR SWITCHES

The present invention relates to a chopper comprising:

transistor switches, said switches being four in number and each comprising an input terminal and an output terminal and being short-circuited by a diode whose anode is connected to the output terminal and whose cathode is connected to the input terminal;

a DC supply whose first terminal is connected to the input terminals of a first switch and of a second switch and whose second terminal is connected to the output terminals of the third switch and of the fourth switch, the output terminal of the first switch being connected to the input terminal of the fourth switch, the output terminal of the second switch being connected to the input terminal of the third switch;

an output transformer comprising a primary winding and a secondary winding, said primary winding being connected in series with an inductance and thus constituting a circuit connected at one end with the output terminal of the first switch and at the other end with the output terminal of the second switch;

means for controlling the switches comprising a Schmitt trigger comparator connected to receive on a first input a first input signal constituted by an AC reference signal with a period T and on a second input a second input signal equal to a fraction of the output signal obtained on the secondary winding of the transformer, this fraction being chosen so that the second input signal will have an RMS value equal to that of the first input signal;

said comparator changing state each time the difference between the first input signal and the second input signal reaches a certain level $\Delta v$ equal to a fraction of the maximum amplitude of the reference signal;

said comparator supplying a first square wave signal which is positive when the error signal obtained by the difference between the two input signals of the comparator increases and zero when said error signal decreases and a second square wave signal in phase opposition with said first square wave signal.

In conventional choppers the switches of a first group of switches comprising the first and the third switches are commutated in phase with the first square wave signal while the switches of a second group of switches comprising the second and fourth switches are commutated in phase with the second square wave signal.

Now, in conventional choppers comprising transistor switches, commutation losses are fairly high.

The chopper embodying the invention makes it possible to reduce these losses.

According to a first embodiment of the invention, the chopper is characterized in that said control means comprises means generating square wave signals with a period T from the reference signal which in combination with said first and second square wave signals coming from the comparator supply signals controlling a first group of switches comprising the first switch and the third switch and a second group of switches comprising the second switch and the fourth switch so that during each period T of the reference signal the switches of the second group will be open during the first half-period T/2;

The switches of the first group will be open during the second half-period T/2;

One of the switches of the first group during the first half-period T/2 will be commutated in phase with the second square wave signal while the other switch of the first group during the same first half-period is closed and one of the switches of the second group during the second half-period T/2 will be commutated in phase with the first square wave signal whereas the other switch of the second group during the same half period is closed.

In the chopper according to the first embodiment of the invention, there are permanently two switches open (non-conducting), one switch closed (conducting) and one switch commutating at the frequency of the error signal.

Further, this chopper operates with great security since there is no danger that the terminals of the supply will be short-circuited by means of the first and fourth switches or the second and third switches since during the first half-period T/2 the second and third switches are open and during the second half-period, the first and fourth switches are open.

In conventional choppers, to prevent the first and fourth switches as well as the second and third switches from conducting simultaneously their commutation moments must be delayed, this causing a distortion of the output signal which is avoided in the chopper embodying the invention.

Further, in the chopper of the invention, the frequency of the error signal will be less than that obtained in the conventional chopper; indeed, the load is no longer subjected to an AC whose voltage is V, supplied to the terminals of the supply source, but to a periodic voltage whose extreme amplitude values are equal to 0 and $+V$ and 0 and $-V$. Indeed, in a same group one switch is closed and the other commutates and when the commutating switch is in the open position, the load is short-circuited by the diode D connected to the terminal of the closed switch.

This reduction of the error signal frequency reduces the distortion of the output signal; however in the vicinity of the change of sign of the reference signal the period of the error signal is greatly lengthened and becomes a distortion factor.

The second embodiment of a chopper according to the invention makes it possible to avoid this disadvantage. The chopper embodying the invention is then characterized in that said control means comprise means generating square wave signals with a period T from the reference signal which in combination with said first and second square wave signals coming from the comparator supply signals controlling a first group of switches comprising the first switch and the third switch and a second group of switches comprising the second switch and the fourth switch so that during each period T of the reference signal the switches of the second group will be open during the first half-period T/2.

The switches of the first group will be open during the second half-period T/2, one of the switches of the first group during the first half-period T/2 will be commutated in phase with the second square wave signal while the other switch of the first group is closed during the majority of the first half-period and commutated in phase with the first square wave signal during the end of said first half-period T/2, one of the switches of the second group will be commutated in phase during the second half-period T/2 with the first square wave while the other switch of the second group is closed during the majority of the second half-period T/2 and commutates in phase opposition with the second square wave signal during the end of said second period T/2.

Instead of keeping one switch in a group of switches always closed while the other commutates at the frequency of the error signal as in the first embodiment, in the second embodiment in each group of switches there is a switch which commutates during one half-period and the other switch of the same group which remains open during the greater part of this half-period and commutates during the end of this half-period in phase with the commutating switch. Thus, the period of the error signal is greatly reduced in the vicinity of the change of sign of the reference signal.

The choppers according to the invention could advantageously be used as power generators with a wide frequency band covering the majority of the frequencies used for sonar of 2 KHz to 14 KHz.

Embodiments of the invention are described by way of example with reference to the accompanying drawings in which:

FIG. 1 is the first embodiment of a chopper embodying the invention.

Figure 1:
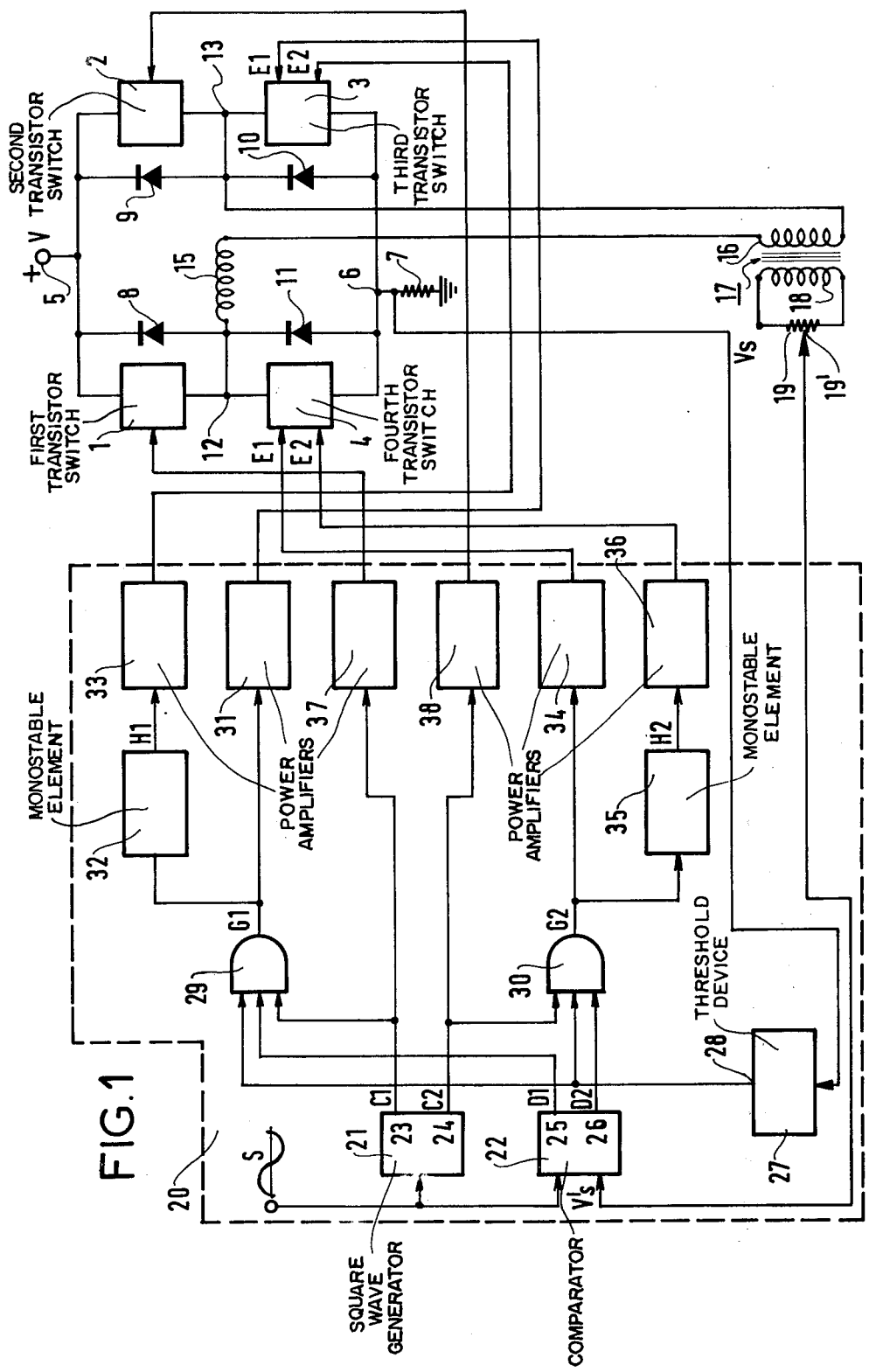
FIG. 1 is a block diagram of a first embodiment of a chopper embodying the invention.

This chopper comprises a first switch 1, a second switch 2, a third switch 3 and a fourth switch 4. The input terminals of the first and second switches are connected to the + terminal of a DC supply 5 of a voltage V.

The first and fourth switches are connected in series between the + terminal of the supply and one end 6 of a resistor 7 whose other end is earthed.

The second and third switches are connected in series between the + terminal of the supply and the point 6.

A diode 8 is connected across the terminals of the first switch 1 and a diode 9 is connected across the terminals of the second switch 2, the anodes of the diodes 8 and 9 being connected to the + terminal of the supply.

A diode 10 is connected across the terminals of the third switch 3 and a diode 11 is connected across the terminals of the fourth switch 4, the cathodes of these diodes being connected to the point 6.

A circuit comprising a series connection of an inductor 15 and the primary winding 16 of a transformer 17 is connected between the point 12 common to the switches 1 and 4 and the point 13 common to the switches 2 and 3. This transformer 17 includes a secondary winding 18 with a ballast resistor 19 connected between its terminals.

The chopper also includes control means 20. These means comprise a square wave generator 21 and a Schmitt trigger connected comparator 22.

The square wave generator 21 is fed with an AC reference signal S whose period is T and delivers on a first output 23 a square wave signal C1 which assumes a positive value according to whether the signal S is positive or negative and on a second output 24 a square wave signal C2 phase shifted by half a period in relation to the signal C1.

The Schmitt trigger comparator 22 receives the signal S on a first input, and on a second input it receives a signal $V'_S$ sampled at 19' on the ballast resistor 19 of the secondary winding 18 of the transformer 17. The signal $V'_S$ is equal to $Vs/k$, $Vs$ being the output signal at the terminals of the secondary winding 18 and $k$ being chosen so that the effective (RMS) values of the reference signal S and $Vs/k$ are equal. The comparator 22 changes state when the amplitude of the voltage $V'_S$ is equal to the sum of or difference between the reference signal voltage and the hysteresis voltage ($+\Delta v$) of the Schmitt trigger 22, $\Delta v$ being of the order of 5% of the output voltage.

Operation is as follows:

for a positive alternation, when $V'_S$ increases, the change of state of the trigger takes place when $V'_S = S + \Delta v$ and when $V'_S$ decreases the change of state takes place when $V'_S = S - \Delta v$;

for a negative alternation, when $V'_S$ decreases the change of state takes place when $V'_S = S - \Delta v$ (i.e. $|V'_S| = |S + \Delta v|$) and when $V'_S$ increases the change of state takes place when $V'_S = S + \Delta v$ (i.e. $|V'_S| = |S - \Delta v|$). The comparator 22 delivers a first square wave signal D1 on a first output 25 which is positive or zero according to whether the error signal E obtained by difference between the output signal $V_S$ and the pilot signal S increases or decreases. The comparator also delivers a second square wave signal D2 on a second output 26 which is the complement of the signal D1 i.e. it is zero when the signal D1 has a positive value and it has a positive value when the signal D1 is zero.

A threshold device 27 has its input connected to the point 6 and delivers a positive signal on its output 28 when the current flowing in the resistor 7 is less than a given value.

The control means 20 also includes a first AND circuit 29 and a second AND circuit 30 each having three inputs. The inputs of the circuit 29 are connected to the output 25 of the comparator 22, to the output 23 of the generator 21 and to the output 28 of the device 27.

The inputs of the circuit 30 are connected to the output 24 of the generator 21, to the output 26 of the comparator 22 and to the output 28 of the device 27. The output of the circuit 29 controls the third switch 3 via a control circuit which comprises a first line connected to a control input E1 of the switch 3 and a second line connected to a control input E2 of the same switch 3. The first line includes a power amplifier 31 and the second line includes a series connection of a monostable element 32 delivering a very narrow pulse whose leading edge corresponds with the trailing edge of any pulse received at its input, connected in series with a second power amplifier 33.

The input of the two channels is connected to the output of the circuit 29.

Likewise the switch 4 comprises control input E1 connected by a power amplifier 34 to the output of the AND circuit 30 and a control input E2 connected by a monostable element 35 in series with a power amplifier 36 to the output of the circuit 30.

The switches 1 and 2 each comprises a single control input, the control input of the switch 1 being connected to the output 23 by a power amplifier 37 and the control input of the switch 2 being connected to the output 24 via a power amplifier 38.

Figure 6:
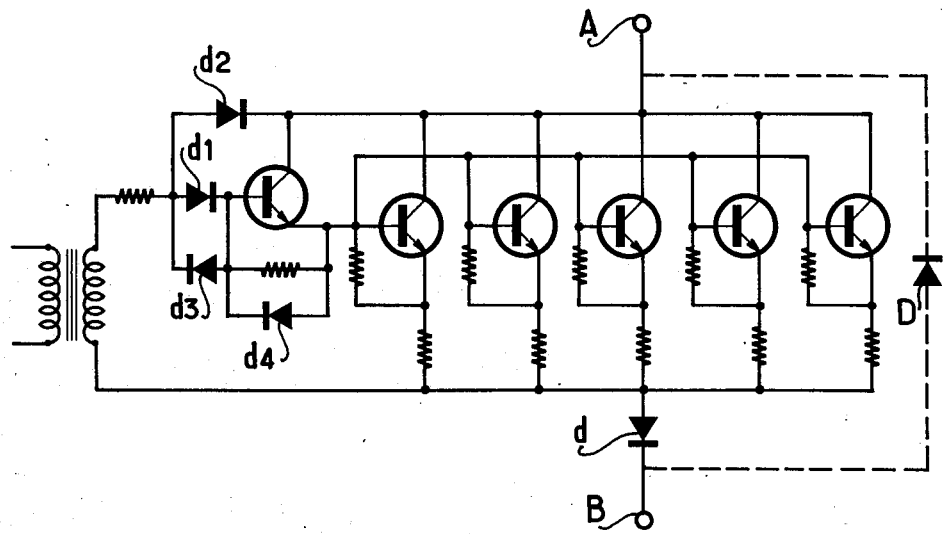
FIG. 6 is a switch for signal switching.
Figure 7:
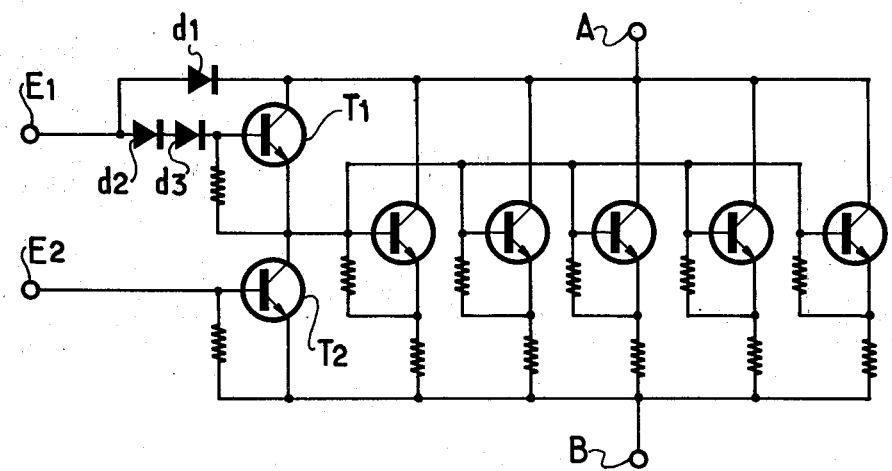
FIG. 7 is a switch for signal chopping.

The switches 1 and 2 are illustrated in detail in FIG. 6 and the switches 3 and 4 are illustrated in detail in FIG. 7.

The operation of the chopper of FIG. 1 is as follows.

Figure 2:
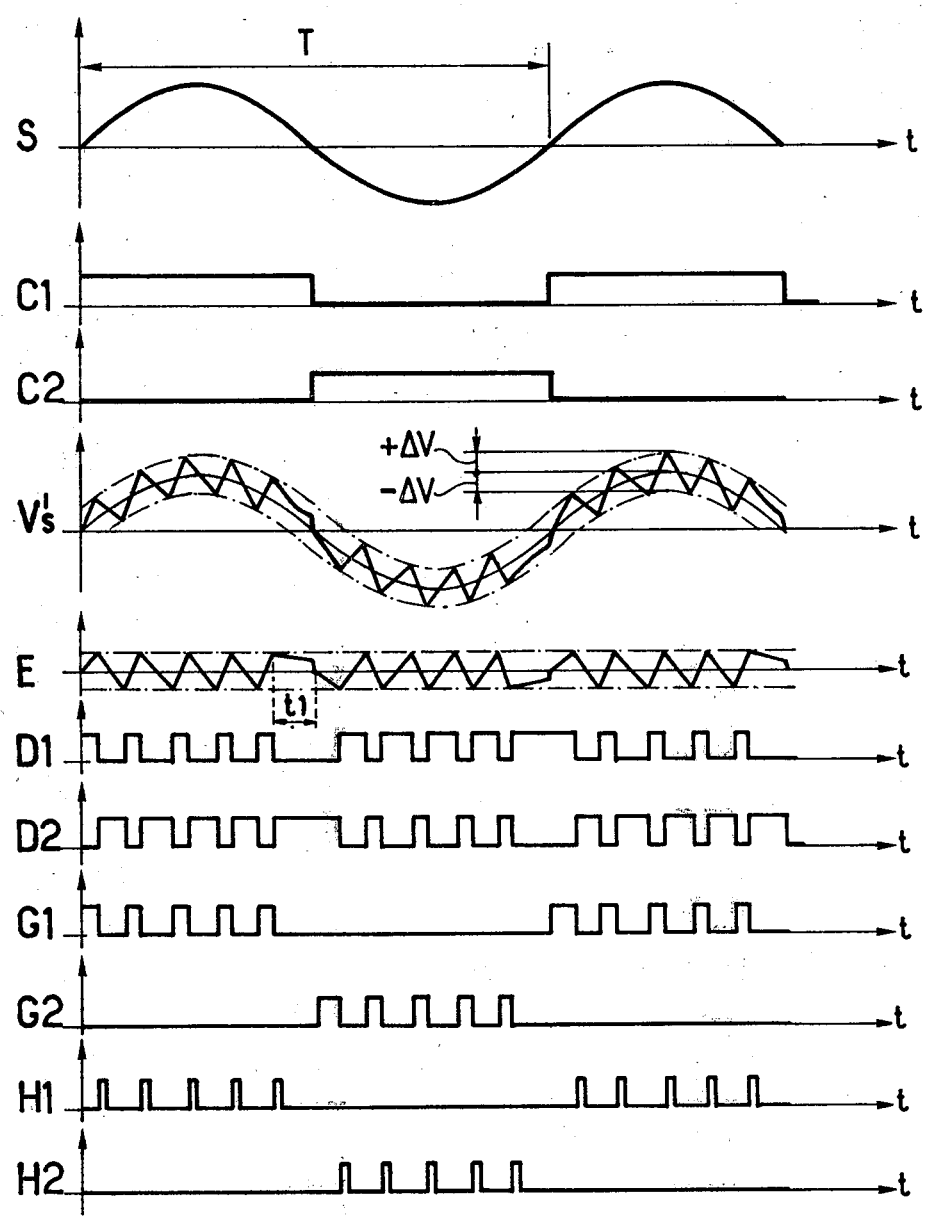
FIG. 2 is a wave form diagram of signals in the chopper of FIG. 1.

The reference signal S with period T as applied to the comparator 22 and to the generator 21 is shown in FIG. 2, line 1. The square wave signal C1 is shown in line 2 and the signal C2 is shown on line 3. The signal $V'_S$ obtained at 19' on the resistor 19 is shown on line 4. The error signal E is shown on line 5. The signal D is shown on line 6 and the signal D2 is shown on line 7. The signal G1 obtained at the output of the circuit 29 is shown on line 8 and the signal G2 obtained at the output of the circuit 30 is shown on line 9. The signal H1 obtained at the output of the monostable element 32 is shown on line 10 and the signal H2 obtained at the output of the monostable element 35 is shown on line 11.

The reference signal S is applied to the comparator 22 and to the generator 21. The generator 21 supplies at its output 23 the signal C1 and at its output 24 the signal C2.

The comparator 22 receives the signal $V'_S$ on a second input and supplies the signal D1 at its output 25 and the signal D2 at its output 26. D1 is a square wave signal which is positive when the signal E obtained by the difference between $V_S$ and S increases and zero when the signal E decreases.

The signal D2 is a square wave signal which is positive when the signal E decreases and zero when the signal E increases.

The signal C1 is applied to the control input of the switch 1 which is closed (conductive) when C1 is positive and open (non-conductive) when C2 is zero.

The signal C2 is applied at the control input of the switch 2 which is closed when C2 is positive and open when C2 is zero.

The signal G2 obtained at the output of the circuit 30 is applied with the signal H2 at the control inputs of the switch 4, this switch being closed when the signal G2 is positive and open when G2 is zero.

The signal G1 obtained at the output of the circuit 29 is applied with the signal H1 at the control inputs of the switch 3, this switch being closed when the signal G1 is positive.

Thus, if it is considered that the switches 1 and 3 constitute a first group of switches and that the switches 2 and 4 constitute a second group of switches, it is observed that during the first half-period T/2 of the signal S:

the switch 3 commutates with the signal D1 (signal G1);

the switch 1 is closed (signal C1 non-zero); and the switches 2 and 4 are open (signals C2 and G2 zero), and conversely during the second half-period T/2:

the switch 4 commutates in phase with the signal D2 (signal G2);

the switch 2 is closed (signal C2 non-zero); and the switches 1 and 3 are open (signals C1 and G1 zero).

Thus during the second half-period the switches 1 and 3 forming the first group are open and during the first half-period the switches 2 and 4 forming the second group are open.

The chopper embodying the invention operates as a power amplifier of very high efficiency and fairly small distortion.

However it will be observed that towards the end of each half-period of the signal $V'_S$, the discharge time of the inductance is long and this signal $V'_S$ remains greater than the signal S (represented by discontinuous lines in the diagram $V'_S$) for a relatively long time. To reduce this time $t_1$ instead of leaving the switch 1 open it can be made to commutate in phase with the switch 4 towards the end of the first half-period, this increasing the frequency of the signal E. Indeed, $+V$ and $-V$ are applied alternately to the terminals of the circuit formed by the inductor 15 and the winding 16 at the frequency of the signal E in conventional choppers instead of a square wave voltage assuming the values O and V during one half-period T/2 (of the reference signal) as in the chopper of FIG. 1.

Hence the voltage $V'_S$ increases along the same slope but decreases more slowly and thus the frequency of the signal E is less in the chopper of FIG. 1 in relation to a conventional chopper; to reduce the time $t_1$, it is necessary to revert to the conventional solution during the end of the half-periods T/2, this constituting an improvement to the chopper of FIG. 1.

Figure 3:
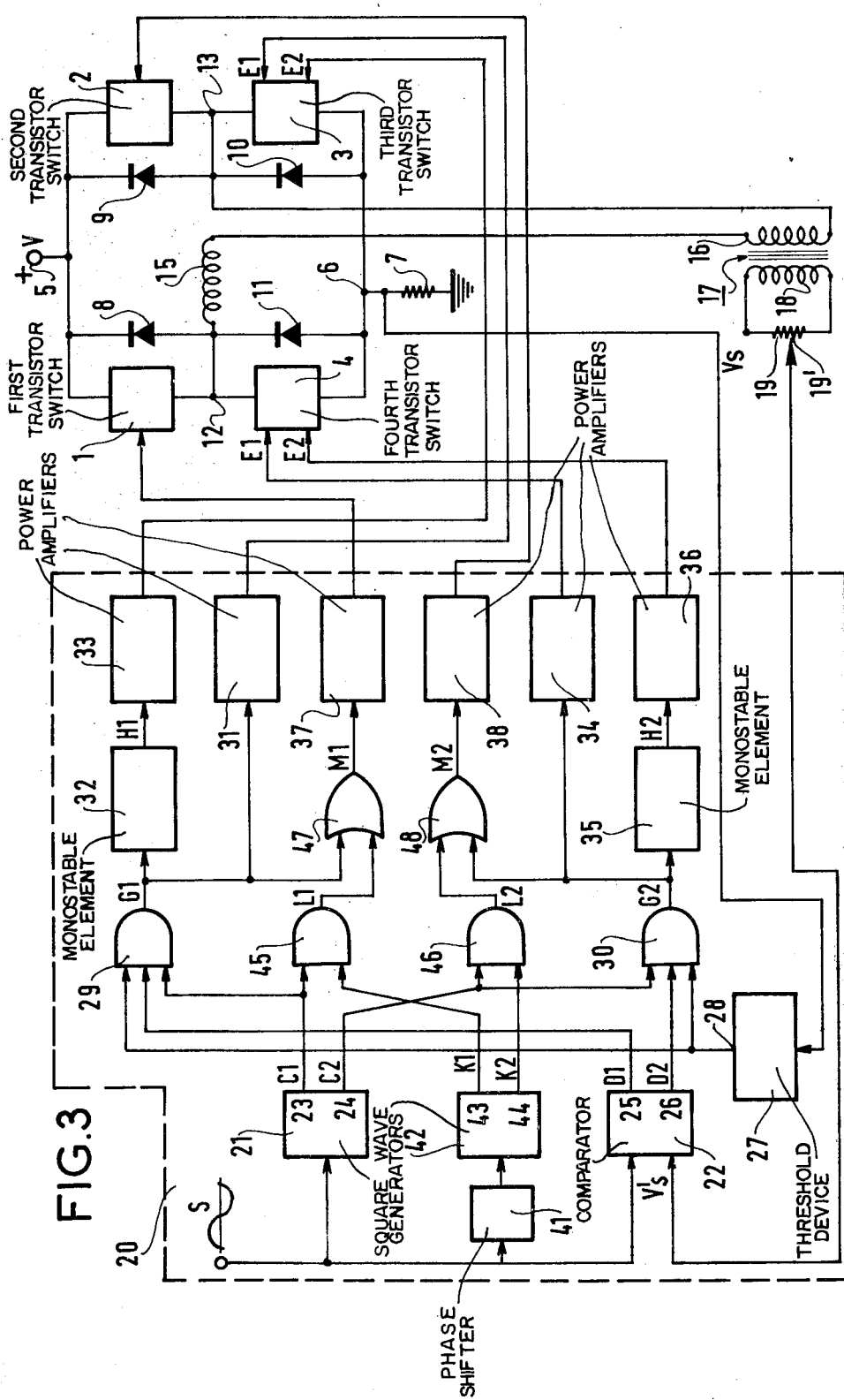
FIG. 3 is a block diagram of a second embodiment of a chopper embodying the invention.

FIG. 3 shows a second embodiment of a chopper according to the invention incorporating said improvement.

In this chopper, only the control of the switches 1 and 2 has been modified.

Besides the elements of the chopper of FIG. 1, the chopper of FIG. 3 comprises a phase shifter 41 having a phase shift of $2\pi/(T-\theta)$, where $\theta<T/2$ preferably of the order of T/12. This phase shifter is driven by the reference signal S. The output of the phase shifter 41 supplies a signal S' phase shifted by $\theta$ in relation to S. The signal S' is applied to a square wave signal generator 42 providing at its output 43 a square wave signal K1 which is positive when S' is positive and zero when S' is negative and providing at its output 44 a square wave signal K2 which is positive when S' is negative and which is zero when S' is zero.

The chopper also comprises an AND gate 45 and an AND gate 46; the AND gate 45 is supplied by the signal K1 coming from the generator 42 and by the signal C1 coming from the generator 21; the AND gate 46 is supplied by the signal K2 coming from the generator 42 and by the signal C2 coming from the generator 21. The output of the AND gate 45 supplies the a signal L1 to a first input of an OR circuit 47 which receives on a second input the signal C1 coming from the AND circuit 29. The OR circuit 47 supplies a signal M1 which is applied via a power amplifier 37 to the control input of the switch 1. The output of the AND gate 46 supplies a signal L2 to a first input of an OR circuit 48 whose second input receives the signal C2 coming from the circuit 30. The OR circuit 48 supplies a signal M2 which is applied via a power amplifier 36 to the control input of the switch 2.

Figure 4:
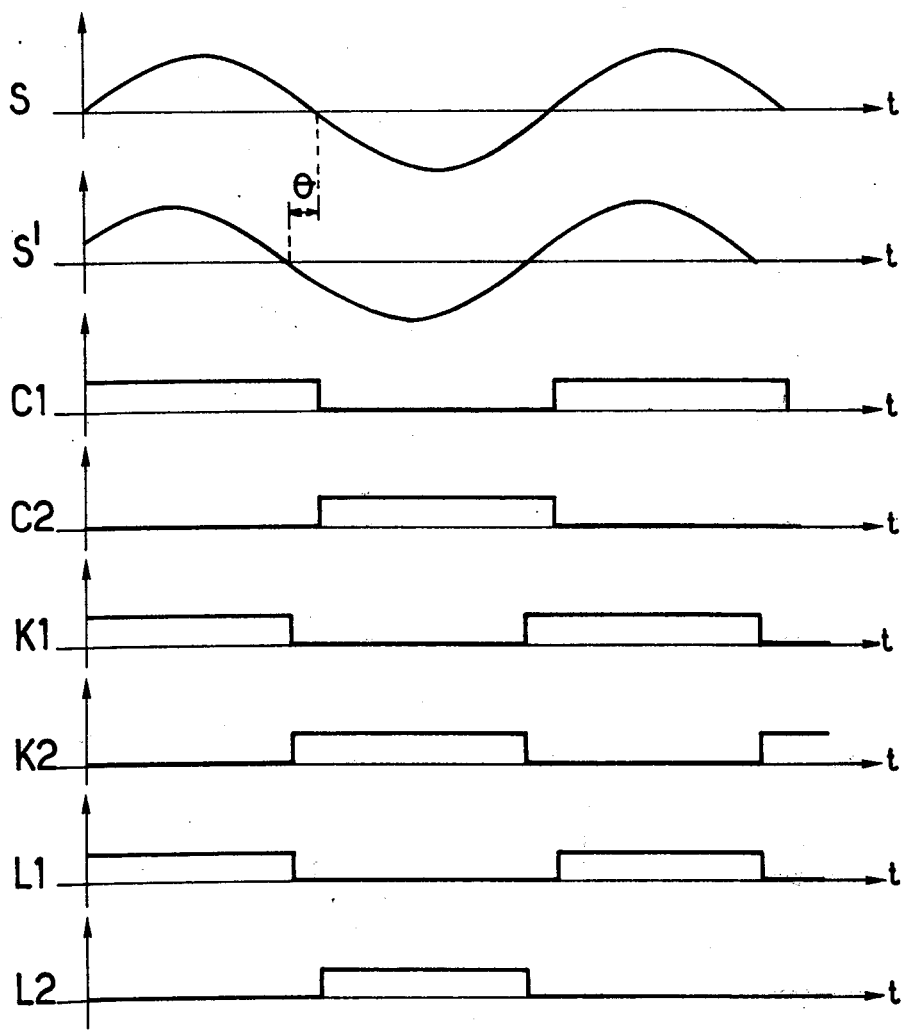
FIGS. 4 and 5 are wave form diagrams of signals in the chopper of FIG. 3.
Figure 5:
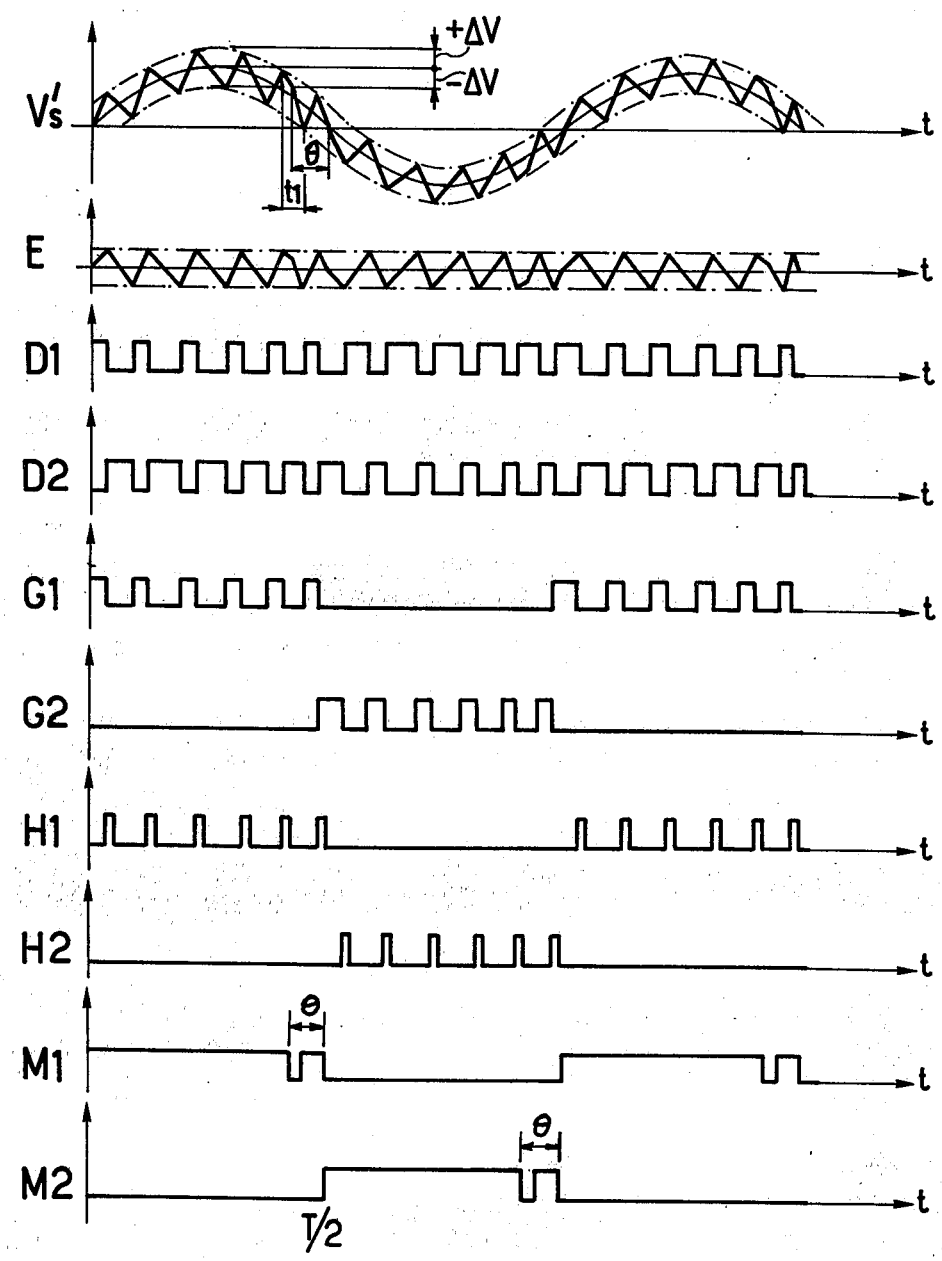

The operation of the chopper according to FIG. 3 will be better understood on referring to FIGS. 4 and 5.

In FIG. 4, line 1 shows the reference signal S whose period is T and line 2 shows the signal S' at the output of the phase shifter which is delayed by $T-\theta$ in relation to the signal S. The square wave signals C1 and C2 obtained at the outputs 23 and 24 of the generator 21 have been shown on lines 3 and 4 of this figure. These signals C1 and C2 are identical to those of FIG. 2. Lines 5 and 6 of FIG. 4 show the square wave signals K1 and K2 obtained at the outputs 43 and 44 of the generator 42. The signal K1 is positive when S' is positive and zero when S' is negative. The signal K2 is positive when S' is negative and zero when S' is positive. The signal L1 obtained at the output of the AND gate 45 is shown on line 6; it is a square wave signal which begins at the same time as C1 and which ends θ before the square wave signals and thus lasts (T/2)−θ. In FIG. 4, line 7 shows the signal L2 obtained at the output of the AND gate 46 whose square wave signals begin at the same time as those of the signal C2 but last only (T/2)−θ.

FIG. 5 shows, the output signal V′$_S$ obtained on the secondary winding of the transformer as well as the error signal E obtained by the difference between the output signal V′$_S$ and the reference signal S.

It will be observed that θ before the end of each half-period T/2 of the reference signal the frequency of the chopper increases in relation to that of the chopper of FIG. 2 at the same instant.

FIG. 5 shows the signal D1 obtained at the output 25 of the comparator 22 and in FIG. 5, line 4 shows the signal D2 obtained at the output 26 of the comparator 22. The siganl D1 is a square wave pulse signal which is positive when E increases and zero when E decreases.

The signal D2 is the complement of D1. Line 5 shows the signal G1 obtained at the output of the AND circuit 29 and deduced from the signal D1 after removal of the pulses of D1 arriving during the square wave pulses of C1. Line 6 shows G2 obtained at the output of the AND gate 46 which is derived from D2 after removal of the pulses of D2 arriving during the square wave pulses of C2. Line 7 shows H1 which is a sequence of narrow pulses which is derived from the signal G1, the leading edges of the pulses of the sequence H1 corresponding to the trailing edges of the pulses of G1. Line 8 shows H2 which is a sequence of narrow pulses derived from G2, the leading edges of the pulses of H2 corresponding to the trailing edges of the pulses of G2. Line 9 shows the signal M1 obtained at the output of the OR circuit 47 and line 10 shows the signal M2 obtained at the output of the OR circuit 48.

The signal M1 is applied at the control input of the switch 1 which is closed while M1 is positive and the signal M2 is applied at the control input of the switch 2 which is closed while M2 is positive.

The signals G1 and H1 are applied at the control inputs E1 and E2 of the switch 3 and this switch 3 is closed while the pulses of G1 last.

The signals G2 and H2 are applied at the control inputs E1 and E2 of the switch 4 and this switch 4 is closed while the pulses of G2 last. Thus, during the first half-period T/2 of the reference signal the switch 3 commutates in phase with D1 (signal G1). The switch 1 is closed during T/2−θ and during the remaining θ is commutated in phase with D1 (signal M1). The switch 2 is open (signal M2 zero). The switch 4 is open (signal G2 zero).

During the second half-period T/2, the switch 1 is open (signal M1 zero). The switch 3 is open (signal G1 zero). The switch 4 commutates in phase with the signal D2 during the remaining θ.

FIG. 6 shows an embodiment of the switches 1 and 2 used for switching the signal.

This switch is controlled via a transformer which provides isolation of the power stage which comprises 5 power transistors connected in parallel. Diodes $d1$ and $d2$ avoid complete saturation of the transistors and reduce the storage time. Diodes $d3$ and $d4$ enable the circulation of a negative current which thus accelerates blocking.

The input A of the switch is connected to the positive terminal of the supply source and the output B is connected to the point 12 or 13.

A diode $d$ placed in series with the five power transistors avoids the reverse polarization of these transistors when the diode connected in parallel to the terminals of the switch is conductive.

FIG. 7 shows an embodiment of the switches 3 and 4 used for chopping the signal.

These switches must be very high performance switches since they commutate at a high frequency and are responsible for the form of the output voltage. The control stage of the switch comprises two transistors T1 and T2 connected in series. The stage comprises an input E1 and an input E2.

The switch comprises five power transistors connected in parallel.

The input A of the switch is connected to the point 12 or 13 and the output B is connected to the point 6.

The signal G1 (respectively G2) applied at E1 trips the conductivity of the power transistors. As soon as G1 (G2) disappears the signal H1 (respectively H2) appears at E2 during a very short time (2 μsec.) and the transistor T2 conducts, short-circuiting the bases and the emitters of the power transistors. Blocking therefore occurs very rapidly.

What is claimed is:

1. A chopper comprising:

transistor switches, said switches being four in number and each comprising an input terminal and an output terminal and being short-circuited by a diode whose anode is connected to the output terminal and whose cathode is connected to the input terminal;

a DC supply whose first terminal is connected to the input terminals of a first switch and of a second switch and whose second terminal is connected to the output terminals of the third switch and of the fourth switch, the output terminal of the first switch being connected to the input terminal of the fourth switch, the output terminal of the second switch being connected to the input terminal of the third switch;

an output transformer comprising a primary winding and a secondary winding, said primary winding being connected in series with an inductance and thus constituting a circuit connected at one end with the output terminal of the first switch and at the other end with the output terminal of the second switch;

means for controlling the switches comprising a Schmitt trigger comparator connected to receive on a first input a first input signal constituted by an AC reference signal with a period T and on a second input a second input signal equal to a fraction of the output signal obtained on the secondary winding of the transformer, this fraction being chosen so that the second input signal will have an RMS value equal to that of the first input signal;

said comparator changing state each time the difference between the first input signal and the second input signal reaches a certain level Δν equal to a fraction of the maximum amplitude of the reference signal;

said comparator supplying a first square wave signal which is positive when the error signal obtained by the difference between the two input signals of the comparator increases and zero when said error signal decreases and a second square wave signal in phase opposition with said first square wave signal; wherein said control means comprises means generating square wave signals with a period T from the reference signal which in combination with said first and second square wave signals coming from the comparator supply signals controlling a first group of switches comprising the first switch and the third switch and a second group of switches comprising the second switch and the fourth switch so that during each period T of the reference signal the switches of the second group will be open during the first half-period T/2;

the switches of the first group will be open during the second half-period T/2;

one of the switches of the first group during the first half-period T/2 will be commutated in phase with the second square wave signal while the other switch of the first group during the same first half-period is closed and one of the switches of the second group during the second half-period T/2 will be commutated in phase with the first square wave signal whereas the other switch of the second group during the same half-period is closed.

2. A chopper comprising:

transistor switches, said switches being four in number and each comprising an input terminal and an output terminal and being short-circuited by a diode whose anode is connected to the output terminal and whose cathode is connected to the input terminal;

a DC supply whose first terminal is connected to the input terminals of the first switch and of the second switch and whose second terminal is connected to the output terminals of the third switch and of the fourth switch, the output terminal of the first switch being connected to the input terminal of the fourth switch, the output terminal of the second switch being connected to the input terminal of the third switch;

an output transformer comprising a primary winding and a secondary winding, said primary winding being connected in series with an inductance and thus constituting a circuit connected at one end with the output terminal of the first switch and at the other end with the output terminal of the second switch;

means for controlling the switches comprising a comparator which is a Schmitt trigger comparator connected to receive on a first input a first input signal constituted by an AC reference signal with a period T and on a second input a second input signal equal to a fraction of the output signal obtained on the secondary winding of the transformer, this fraction being chosen so that the second input signal will have an RMS value equal to that of the first input signal;

said comparator changing state each time the difference between the first input signal and the second input signal reaches a certain level $\Delta v$ equal to a fraction of the maximum amplitude of the reference signal;

said comparator supplying a first square wave signal which is positive when the error signal obtained by the difference between the two input signals of the comparator increases and zero when said error signal decreases and a second square wave signal in phase opposition with said first square wave signal; wherein said control means comprise means generating square wave signals with a period T from the reference signal which in combination with said first and second square wave signals coming from the comparator supply signals controlling a first group of switches comprising the first switch and the third switch and a second group of switches comprising the second switch and the fourth switch so that during each period T of the reference signal switches of the second group will be open during the first half-period T/2;

the switches of the first group will be open during the second half-period T/2, one of the switches of the first group during the first half-period T/2 will be commutated in phase with the second square wave signal while the other switch of the first group is closed during the majority of the first half-period and commutated in phase with the first square wave signal during the end of said first half-period T/2, one of the switches of the second group will be commutated in phase during the second half-period T/2 with the first square wave while the other switch of the second group is closed during the majority of the second half-period T/2 and commutates in phase opposition with the second square wave signal during the end of said second period T/2.

* * * * *